US005984264A

United States Patent [19]

Ricco

[11] Patent Number: 5,984,264

[45] Date of Patent: Nov. 16, 1999

[54] PERFECTED ELECTROMAGNETIC METERING VALVE WITH A BALL SHUTTER FOR A FUEL INJECTOR

[75] Inventor: Mario Ricco, Bari, Italy

[73] Assignee: Elasis Sistema Ricerca Fiat Nel Mezzogiorno Societa Consortile per Azioni, Pomigliani D'Arco, Italy

[21] Appl. No.: 08/987,973

[22] Filed: Dec. 10, 1997

[30] Foreign Application Priority Data

Dec. 23, 1996 [IT] Italy ................................ TO96A1075

[51] Int. Cl.[6] ................................................ F16K 31/06

[52] U.S. Cl. ................................ 251/129.16; 239/585.3

[58] Field of Search .................... 251/129.16; 239/585.3, 239/585.1, 585.5

[56] References Cited

U.S. PATENT DOCUMENTS

| | | |
|---|---|---|
| 4,997,004 | 3/1991 | Barkhimer . |
| 5,211,341 | 5/1993 | Wieczorek .................... 251/129.16 X |
| 5,244,150 | 9/1993 | Ricco et al. . |
| 5,381,999 | 1/1995 | Ricco . |

FOREIGN PATENT DOCUMENTS

| | | |
|---|---|---|
| 0753658 | 1/1997 | European Pat. Off. . |

*Primary Examiner*—Kevin Lee
*Attorney, Agent, or Firm*—Ladas & Parry

[57] ABSTRACT

The metering valve has a ball shutter for a conical seat over a discharge conduit, and an electromagnet for controlling an armature; a stem of the armature has a flange, is guided by a fixed sleeve, and is pushed by a spring to keep the ball in contact with the conical seat; provision is made, between the flange and the ball, for a decoupling joint in the form of a plate having a flat surface engaging the flange and a spherical concavity engaging the ball to center the ball on the conical seat; and the diameter of the concavity is slightly larger than the diameter of the ball to reduce the pressure between the mutually engaging surfaces of the concavity and the ball.

4 Claims, 2 Drawing Sheets

PERFECTED ELECTROMAGNETIC METERING VALVE WITH A BALL SHUTTER FOR A FUEL INJECTOR

BACKGROUND OF THE INVENTION

The present invention relates to a perfected electromagnetic metering valve with a ball shutter for a fuel injector, and in particular for internal combustion engines.

The metering valves of fuel injectors normally comprise a control chamber with a discharge conduit, which is normally closed by a very hard ball. In known metering valves, the ball is normally kept in the closed position inside a seat of the discharge conduit by a spring, and, when a control electromagnet is energized, the armature frees the ball from the spring to open the conduit. On account of the high pressure of the fuel inside the control chamber, a very strong spring is required to close the valve.

In known valves, the armature is connected to a stem, which is pressed by the spring directly on to the shutter, so that contact between the stem and the ball is substantially point-to-point. This results in severe pressure between the ball and stem, and, as the ball is made of harder material than the stem, eventually in deformation of or wear marks on the stem, which eventually affect the travel of the ball.

As is known, the travel of the ball, and hence of the armature of the electromagnet, is one of the main parameters determining the amount of fuel injected into the engine. That is, for a given length of time the electromagnet is energized, and for a given supply pressure, an increase in the travel of the ball corresponds to an increase in the opening and closing time of the valve, and hence an increase in the amount of fuel injected.

Moreover, inevitable tolerances in the manufacture of the transmission mechanism between the armature and the ball make it extremely difficult to perfectly align the armature, stem and ball seat axes, so that known valves present the problem of activating the ball in a perfectly axial direction with respect to the seat, i.e. eliminating the transverse components generated by the action of the stem on the ball. Also, to ensure effective sealing of the valve, the active surface of the armature must be perfectly parallel to the seating surface of the ball.

Metering valves of the above type are known in which the valve seat is conical to avoid contact of the ball with a sharp edge; and a further metering valve has been proposed in which the stem comprises a spherical cavity enclosing the ball. Such a cavity, however, allows of no lateral movement of the ball, so that, in the event of misaligned activation of the ball, due to inevitable assembly tolerances of the valve components, the ball is incapable of centering itself automatically.

SUMMARY OF THE INVENTION

It is an object of the present invention to provide a highly straightforward, reliable metering valve of the above type, designed to eliminate the aforementioned drawbacks of known devices by ensuring sealing of the valve under maximum pressure conditions, and reliable, constant operation of the injector.

According to the present invention, there is provided an electromagnetic metering valve with a ball shutter, comprising a ball acting on a conical seat to close a discharge conduit of a control chamber of an injector; and an electromagnet for activating an armature to control a cylindrical stem coaxial with said conical seat and normally pushed elastically to keep said ball in the closed position against said conical seat; said stem being guided by a guide sleeve also coaxial with said conical seat; characterized in that a decoupling joint is provided between said stem and said ball to transmit the action of said stem to said ball coaxially with said conical seat, and reduce the eventual variation in the travel of said armature due to wear by said ball.

More specifically, the decoupling joint comprises a plate having a flat surface engaging the stem, and a spherical concavity opposite said flat surface and engaging the ball; said concavity centering the ball on the conical seat, and ensuring optimum sealing of the valve. Advantageously, the diameter of the concavity is slightly larger than the diameter of the ball to reduce the pressure between the mutually engaging surfaces of the concavity and the ball.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
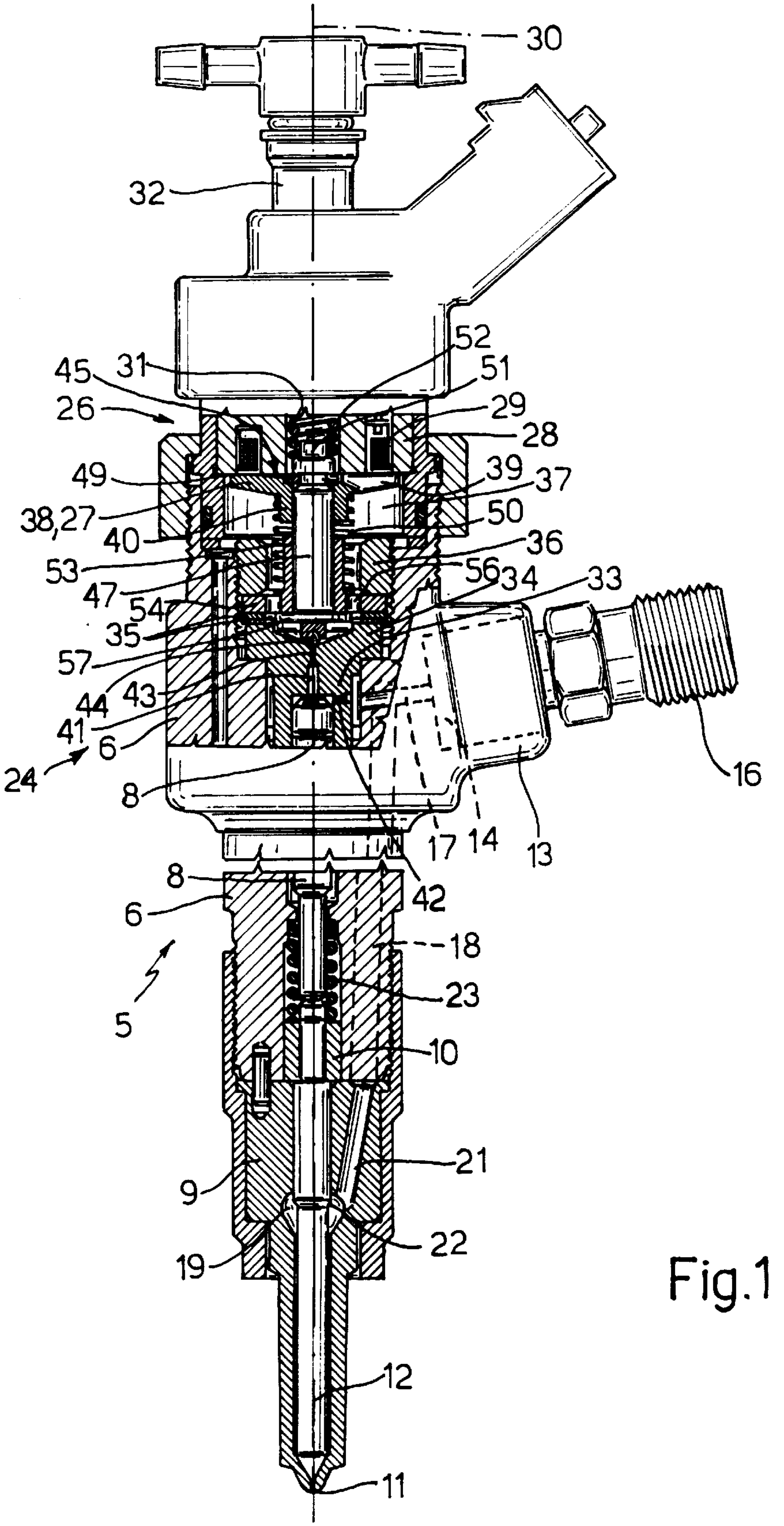
FIG. 1 shows a partially sectioned view of a fuel injector featuring a metering valve in accordance with the present invention.

Number 5 in FIG. 1 indicates a fuel injector, e.g. for a diesel internal combustion engine, comprising a hollow body 6 connected to a nozzle 9 terminating with one or more injection orifices 11; and a control rod 8 slides inside body 6, and is connected by a joint 10 to a pin 12 for closing orifice 11.

Figure 2:
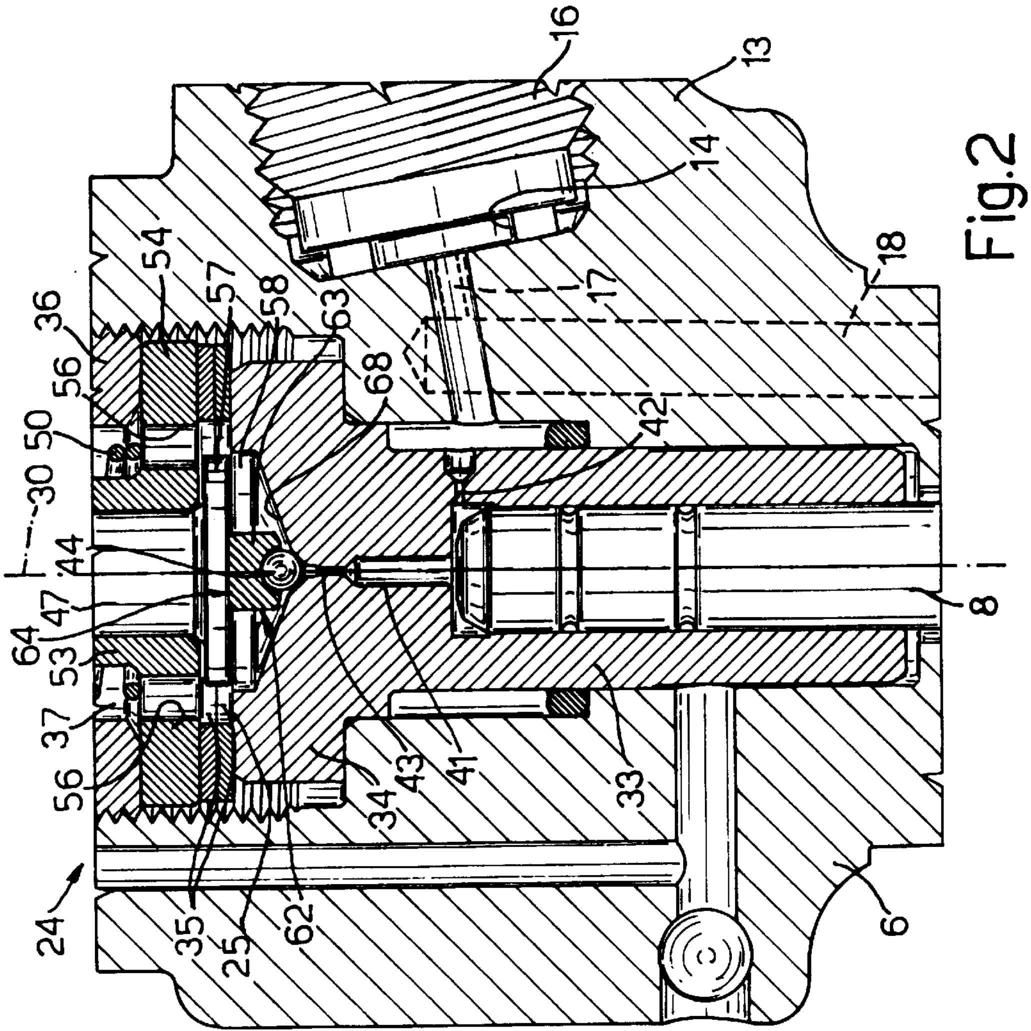
FIG. 2 shows a larger-scale section of the metering valve of the FIG. 1 injector.

Body 6 comprises an appendix 13 in which is inserted an inlet fitting 16 connected to a normal fuel supply pump, and which in turn comprises a hole 14 (FIG. 2) communicating via conduits 17, 18 and 21 (FIG. 1) with an injection chamber 19 of nozzle 9; pin 12 comprises a shoulder 22 on which the pressurized fuel in chamber 19 acts; and a compression spring 23 assists in pushing pin 12 downwards.

Injector 5 also comprises a metering valve indicated as a whole by 24, and in turn comprising an electromagnet 26 for controlling an armature 27; and electromagnet 26 comprises an annular magnetic core 28 having an axis 30, housing a normal electric coil 29, and having an axial hole 31 communicating with a discharge fitting 32 connected to the fuel tank.

Metering valve 24 also comprises a body 33 coaxial with axis 30, and having a flange 34 fitted to body 6 by a ring nut 36 via the interposition of calibrated washers 35 (FIG. 2) as described in detail later on; armature 27 is coaxial with axis 30 and comprises a disk 38 forming one piece with a sleeve 40 and having one or more slots 39 through which a discharge chamber 37 formed in body 6 communicates with central hole 31 of core 28; and disk 38 comprises an active surface 45 facing core 28 and perpendicular to axis 30.

Body 33 of valve 24 also comprises an axial control chamber 41 in turn comprising a calibrated radial inlet conduit 42 (FIG. 2) communicating with hole 14, and a calibrated discharge conduit 43 coaxial with axis 30 and communicating with discharge chamber 37. Control chamber 41 is defined at the bottom by the top surface of rod 8; and, by virtue of the larger area of the top surface of rod 8 as compared with that of shoulder 22 (FIG. 1), the pressure of the fuel, with the aid of spring 23, normally keeps rod 8 in such a position as to close orifice 11 of nozzle 9.

Figure 3:
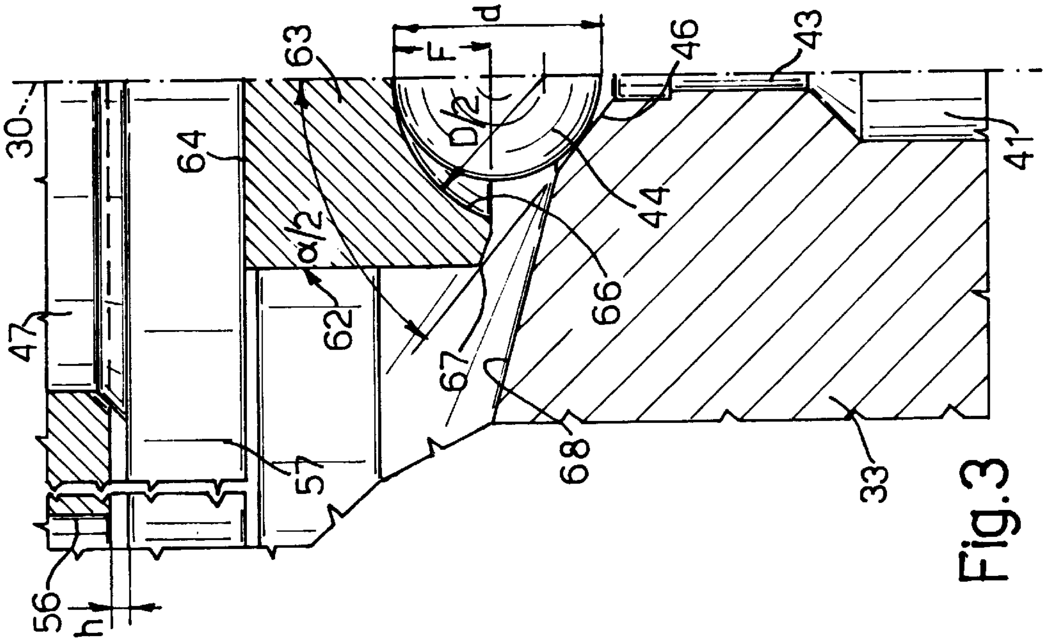
FIG. 3 shows a larger-scale detail of FIG. 2.

Discharge conduit 43 of control chamber 41 is normally closed by a shutter in the form of a ball 44 made of very hard material, e.g. tungsten carbide, which rests on a conical seat 46 (FIG. 3) of body 33, coaxial with conduit 43, and is controlled by a cylindrical stem 47 (FIG. 2) having a groove housing a C-shaped ring 49 against which disk 38 is pushed by a spring 50, so that armature 27 is disconnected from stem 47.

A given length of stem 47 projects inside hole 31 and terminates with a small-diameter portion 51 for supporting and anchoring a first compression spring 52 housed inside hole 31; stem 47 slides inside a fixed sleeve 53 coaxial with axis 30 and forming one piece with a bottom flange 54 (FIG. 2) comprising axial holes 56; and, at the bottom, stem 47 comprises an integral flange 57 perpendicular to axis 30 and which is arrested against the bottom surface of flange 54.

Ring nut 36 forces flange 54 against calibrated washers 35, which act on a flat surface 55 of flange 34 of body 33; flange 34 in turn rests against a shoulder of body 6 of the injector; and ring nut 36 is threaded externally and screwed to a thread of discharge chamber 37 (FIG. 1). More specifically, washers 35 are so selected as to define the desired travel h of stem 47; and flange 57 of stem 47 is housed inside a swirl chamber 58 communicating via holes 56 with discharge chamber 37.

The inevitable manufacturing tolerances involved in the assembly of body 6, core 28, washers 35, flange 54, sleeve 53, stem 47, sleeve 48 and armature 27 make it extremely difficult to perfectly align the axes of armature 27, stem 47 and conical seat 46. And, if the stem were to act directly on ball 44, this would result in point-to-point contact between flange 54 and ball 44, and the hardness of ball 44 would result in rapid deformation of and wear marks on flange 54.

Moreover, even the slightest misalignment of any one of the above axes would subject ball 44 to a transverse component in the action of spring 52, which would prevent ball 44 from perfectly contacting seat 46, thus impairing operation of valve 24 and also rapidly deforming seat 46.

According to the present invention, to eliminate the above drawbacks, a decoupling joint, indicated as a whole by 62, is provided between flange 57 of stem 47 and ball 44 to disconnect flange 54 from ball 44 and so guide ball 44 as to keep it centered with respect to the axis of seat 46; which joint 62 comprises a circular plate 63 (FIG. 3) having a flat surface 64 and a spherical concavity 66 opposite flat surface 64.

More specifically, flat surface 64 engages flange 57 of stem 47, and permits a certain amount of transverse movement of plate 63 with respect to the axis of stem 47; whereas concavity 66 engages ball 44, and provides for centering the action of stem 47 along the axis of conical seat 46, so as to compensate for inevitable misalignment of the axes of armature 27, stem 47 and body 33 of valve 24, and any lack of parallelism between surface 45 (FIG. 1) of disk 38 of armature 27 and surface 55 (FIG. 2) of body 33.

Diameter D of concavity 66 (FIG. 3) is slightly larger than diameter d of ball 44 to reduce the pressure between the mutually engaging surfaces of concavity 66 and ball 44; and concavity 66 has a camber F to prevent withdrawal of ball 44 when armature 27 (FIG. 1) is attracted by core 28.

More specifically, the ratio d/D between the diameter d of ball 44 and diameter D of concavity 66 may range between 92/100 and 98/100, and camber F between 8/10 and 9/10 of diameter d of ball 44. Advantageously, with a conduit 43 of about 0.25 mm in diameter, diameter d of ball 44 may be about 1.35 mm, diameter D of concavity 66 of about 1.40 mm, and camber F of about 1.00 mm.

Also, the apex angle $\alpha$ of conical seat 46 may range between 110° and 120°; and, to prevent interference between a peripheral edge 67 of plate 63 and the surface of conical seat 46, the upper surface 25 of body 33 comprises a cavity 68, which may comprise a truncated-cone-shaped surface with an apex angle greater than angle $\alpha$ of seat 46.

Metering valve 24 of injector 5 operates as follows.

When coil 29 is energized (FIG. 1), core 28 attracts disk 38 of armature 27, which, by means of ring 49, positively draws stem 47 upwards in opposition to spring 52; flange 57 of stem 47 produces turbulence inside chamber 58 to cushion the arrest of flange 57 against fixed flange 54; the fuel pressure inside chamber 41 therefore moves ball 44 into the open position to discharge the fuel from chamber 41 back into the tank; and the fuel pressure inside chamber 19 overcomes the residual pressure on the upper surface of rod 8 to raise pin 12 and so inject the fuel in chamber 19 through orifice 11.

When coil 29 is de-energized, spring 52 pushes stem 47 down so as to draw armature 27 down by means of ring 49; the kinetic energy of stem 47 is also partly dissipated by the turbulence created by flange 57 in the fuel inside chamber 58; by virtue of the clearance due to the difference in diameters D and d, the surface of concavity 66 (FIG. 3) of plate 63 mating with ball 44 enables ball 44 to be centered at all times with respect to conical seat 46 of valve 24; ball 44 therefore closes discharge conduit 43; and the pressurized fuel restores the pressure inside control chamber 41, so that pin 12 (FIG. 1) closes orifice 11.

Moreover, by virtue of contact between ball 44 and concavity 66 (FIG. 3) occurring between two spherical surfaces of slightly different diameters, the pressure on said surfaces is reduced, thus preventing the formation of wear marks and, hence, a variation in the travel h of armature 27, and so ensuring long-term consistency as regards the amount of fuel injected.

As compared with known valves, the advantages of metering valve 24 according to the invention will be clear from the foregoing description. In particular, plate 63 provides, on the one hand, for guiding and centering ball 44 with respect to conical seat 46, and, on the other, for improving the stability of valve 24.

Clearly, changes may be made to the metering valve as described and illustrated herein without, however, departing from the scope of the present invention. For example, armature 27 may form one piece with stem 47; stem 47 need not necessarily comprise flange 57; and the shape and size of plate 63 may be other than described.

I claim:

1. An electromagnetic metering valve with a ball shutter for a fuel injector, comprising a ball acting on a conical seat to close a discharge conduit of a control chamber of the injector; and an electromagnet for activating an armature to control a cylindrical stem coaxial with said conical seat and normally pushed elastically to keep said ball in the closed position against said conical seat; said stem being guided by a guide sleeve also coaxial with said conical seat; and a decoupling joint to transmit the action of said stem to said ball coaxially with said conical seat, said decoupling joint comprising a plate having a flat surface engaging said stem, and a spherical concavity opposite said flat surface and engaging said ball; said concavity having a diameter (D)

slightly larger than the diameter (d) of said ball to reduce the pressure between mutually engaging surfaces of said concavity and said ball.

2. A valve as claimed in claim 1, wherein the ratio (d/D) between the diameter (d) of said ball and the diameter (D) of said concavity ranges between 99/100 and 98/100; the hardness of said ball being greater than that of said plate.

3. A valve as claimed in claim 2, wherein in the the apex angle of said conical seat ranges between 110° and 120°.

4. A valve as claimed in claim 1, wherein said armature is in the form of a disk coaxial with said stem; said disk forming one piece with a sleeve sliding on said stem in opposition to a spring; and said stem forming one piece with a flange engaging said flat surface of said plate.

* * * * *